United States Patent
Lim et al.

(10) Patent No.: US 9,658,452 B2
(45) Date of Patent: May 23, 2017

(54) GLASS TYPE TERMINAL HAVING THREE-DIMENSIONAL INPUT DEVICE AND SCREEN CONTROL METHOD THEREOF

(71) Applicant: LG ELECTRONICS INC., Seoul (KR)

(72) Inventors: Gukchan Lim, Seoul (KR); Sukjin Lee, Seoul (KR); Younghun Joo, Seoul (KR); Seonghyok Kim, Seoul (KR); Jonghun Kwon, Seoul (KR); Sungho Woo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 14/477,481

(22) Filed: Sep. 4, 2014

(65) Prior Publication Data

US 2015/0103021 A1  Apr. 16, 2015

(30) Foreign Application Priority Data

Oct. 15, 2013  (KR) .................. 10-2013-0122695

(51) Int. Cl.
| | | |
|---|---|---|
| *G06F 3/041* | (2006.01) | |
| *G02B 27/01* | (2006.01) | |
| *G06F 3/01* | (2006.01) | |
| *G06F 1/16* | (2006.01) | |
| *G06F 3/0482* | (2013.01) | |
| *G06F 3/0484* | (2013.01) | |
| *G06F 3/0488* | (2013.01) | |

(Continued)

(52) U.S. Cl.
CPC ........... *G02B 27/017* (2013.01); *G06F 1/163* (2013.01); *G06F 3/017* (2013.01); *G06F 3/03547* (2013.01); *G06F 3/0482* (2013.01); *G06F 3/04845* (2013.01); *G06F 3/04883* (2013.01); *H04N 5/23216* (2013.01); *H04N 5/23293* (2013.01); *G02B 2027/014* (2013.01); *G02B 2027/0138* (2013.01); *G02B 2027/0178* (2013.01); *G02B 2027/0187* (2013.01); *G06F 2203/0339* (2013.01); *G06F 2203/04806* (2013.01); *G06F 2203/04808* (2013.01)

(58) Field of Classification Search
CPC ........ G09G 5/00; G02B 27/01; G02B 27/017; G02B 2027/0178; G06F 3/041; G06F 3/017
USPC ............................................ 345/8, 173, 174
See application file for complete search history.

(56) References Cited

U.S. PATENT DOCUMENTS 9,213,185 B1 * 12/2015 Starner ................. G06T 19/006
9,366,862 B2 *  6/2016 Haddick ............ G02B 27/0093
(Continued)

*Primary Examiner* — Calvin C Ma
(74) *Attorney, Agent, or Firm* — Lee, Hong, Degerman, Kang & Waimey PC

(57) ABSTRACT

Disclosed are a glass type terminal capable of supporting gestures using one finger or two fingers by providing a three-dimensional input device at a temple hinged to a rim of a lens, and an input method thereof. For three-dimensional touch inputs, the temple is configured to have an upper surface, a lower surface, an inner side surface and an outer side surface provided touch sensor, respectively. Upon sensing of a touch input applied onto said one or more surfaces of the temple using one finger or two fingers, a screen displayed on a lens is controlled in correspondence to the sensed touch input. Under such configuration, a user can control the screen in a more convenient manner.

18 Claims, 21 Drawing Sheets

(51) Int. Cl.
*G06F 3/0354* (2013.01)
*H04N 5/232* (2006.01)

(56) References Cited

U.S. PATENT DOCUMENTS

2007/0052428 A1* 3/2007 Van Berkel ............ G06F 1/1626
  324/662
2011/0194029 A1* 8/2011 Herrmann ............ G02B 27/017
  348/569

* cited by examiner

TOUCH ON
UPPER SURFACE

DISPLAY OF MAIN MENUS

TOUCH ON
LOWER SURFACE

DISPLAY OF SUB MENUS

TOUCH ON UPPER SURFACE
AND LOWER SURFACE

SIMULTANEOUS DISPLAY OF
MAIN MENUS AND SUB MENUS

DISPLAY OF DEFAULT SCREEN

⇩

⇩

EXECUTION OF PINCH GESTURE

⇩

END OF GUIDE, AND DISPLAY OF INITIAL SCREEN

GLASS TYPE TERMINAL HAVING THREE-DIMENSIONAL INPUT DEVICE AND SCREEN CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0122695, filed on Oct. 15, 2013, the contents of which are hereby incorporated by reference herein in its entirety.

BACKGROUND OF THE DISCLOSURE

1. Field of the Disclosure

The present disclosure relates to a glass type terminal, and particularly, to a glass type terminal capable of performing various screen controls by touching one or more surfaces of a temple, in a structure where a three-dimensional input device is provided at the temple, and an input method thereof.

2. Background of the Disclosure

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs.

Furthermore, the efforts for supporting and enhancing the functions of the mobile terminal have been carried out. The foregoing efforts may include adding and improving software or hardware as well as changing and improving structural elements constituting a mobile terminal.

As a wearable device such as a smart watch and a glass type terminal is recently developed, the wearable device is configured to provide various services by itself or by interworking with a mobile terminal. The glass type terminal has a function to capture an object or a scene positioned at a front side toward which a user's eye line is, through simple manipulations. Also, the glass type terminal has a function to check simple information such as mails, weather and traffic guidance.

However, only the specification and basic functions of the glass type terminal have been proposed. Various functions and user interfaces (UI) related thereto are currently under development. Especially, a user has to touch one surface of a temple of eyeglasses using one finger, in order to select and check desired information. This may cause inconvenience in manipulating various user interfaces.

SUMMARY OF THE DISCLOSURE

Therefore, an aspect of the detailed description is to provide a glass type terminal capable of being manipulated in a more rapid and convenient manner, by providing a three-dimensional input device at a temple, and an input method thereof.

Another aspect of the detailed description is to provide a glass type terminal capable of performing various screen controls by touching one or more surface of a temple using one finger or two fingers, in a structure where a three-dimensional input device is provided at the temple, and an input method thereof.

To achieve these and other advantages and in accordance with the purpose of this specification, as embodied and broadly described herein, there is provided a glass type terminal, comprising: a lens configured to display a screen; a temple hinged to a rim of the lens and having a plurality of surfaces on which touch sensors are provided; and a controller configured to sense touch input with respect to the one or more surfaces of the temple through the touch sensor and control the screen based on the sensed touch input.

The temple may be composed of an upper surface, a lower surface, an inner surface and an outer surface. The lens may be provided for one eye or two eyes.

Touch patterns, configured to control the screen, may be formed on the upper surface, the lower surface and the outer surface. And a touch pattern, configured to determine whether the glass type terminal has been worn or not, may be formed on the side surface.

A touch pattern may be formed on each surface of the temple except for the inner surface, such that TX electrodes are arranged in a lengthwise direction of the temple, and RX electrodes are arranged in a widthwise direction of the temple. And a relatively smaller number of TX electrodes may be arranged on the inner surface.

A bundle of the RX electrodes may be arranged on the inner surface of the temple, whereas a bundle of the TX electrodes may be arranged at an inner corner region on the outer side surface of the temple.

The controller may be configured to: enter a capturing mode if a user holds the temple using two fingers; enlarge or contract a preview image of an object to be captured, if the two fingers which are on the temple are simultaneously moved back or forth; focus the object to be captured, according to a moving direction of a head; and capture the object if the two fingers which are on the temple are detached from the temple to re-touch the temple.

The controller may display related menus on the screen if the two fingers are moved in different directions, wherein if an index finger of the two fingers is moved, a main menu is displayed on an upper region of the screen, wherein if a thumb of the two fingers is moved, a sub menu is displayed on the screen, and wherein if the index finger and the thumb are simultaneously moved, both of the main menu and the sub menu are displayed on the screen.

The controller may integrate a function of the main menu and a function of the sub menu, by putting the index finger and the thumb, which are on the upper surface and the lower surface of the temple respectively, together on the outer side surface of the temple.

The controller may display a gesture guide on the screen, if the user has worn the glass type terminal or if the user has lifted up and moved down the temple using the index finger and the thumb.

To achieve these and other advantages and in accordance with the purpose of this specification, as embodied and broadly described herein, there is also provided a method for controlling a screen of a glass type terminal, the method comprising: sensing whether the glass type terminal has been worn or not, based on a touch input to an inner surface of a temple hinged to a lin of a lens; sensing a touch input to at least one of an upper surface, a lower surface and an outer surface of the temple; and controlling a screen displayed on the lens, according to the sensed touch input to said one or more surfaces of the temple.

The surface of the temple may be touched by one finger or two fingers.

A main menu may be displayed on an initial screen when the upper surface of the temple is touched, and a sub menu may be displayed on the initial screen when the lower surface of the temple is touched.

The displayed menus may be shifted by moving a thumb and an index finger individually back and forth, or simultaneously back or forth.

A pinch operation of the screen may be performed by narrowing or widening the index finger and the thumb on a specific surface, or by putting the index finger and the thumb which are on the upper surface and the lower surface together on the outer side surface, or by moving the index finger and the thumb which have been put together on the outer side surface, to the upper surface and the lower surface, respectively.

A rotation operation of the screen may be performed by moving the index finger and the thumb which are on the upper surface and the lower surface, respectively, in opposite directions, or by moving the thumb on the lower surface while the index finger is fixed to the upper surface, or by moving the index finger on the upper surface while the thumb is fixed to the lower surface.

The method may further comprise displaying a gesture guide on the screen, if it is sensed that a user has worn the glass type terminal, or if the user has lifted up and moved down the temple using the index finger and the thumb.

The step of controlling the screen may include: automatically entering a capturing mode when the two fingers touch the temple; enlarging or contracting a preview image of an object to be captured, if the two fingers which are on the temple are simultaneously moved back or forth; focusing the object to be captured, according to a moving direction of a head; and capturing the object if the two fingers which are on the temple are detached from the temple to re-touch the temple.

The method may further comprise displaying related menus on the screen if the two fingers are moved back and forth, wherein the step of displaying related menus includes: displaying a main menu on an upper region of the screen, if the index finger of the two fingers is moved; displaying a sub menu on the screen, if the thumb of the two fingers is moved; and displaying both of the main menu and the sub menu on the screen, if the index finger and the thumb are simultaneously moved.

A function of the main menu and a function of the sub menu may be integrated with each other, by putting the index finger and the thumb, which are on the upper surface and the lower surface of the temple respectively, together on the outer side surface of the temple.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PC, ultra books and the like. However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
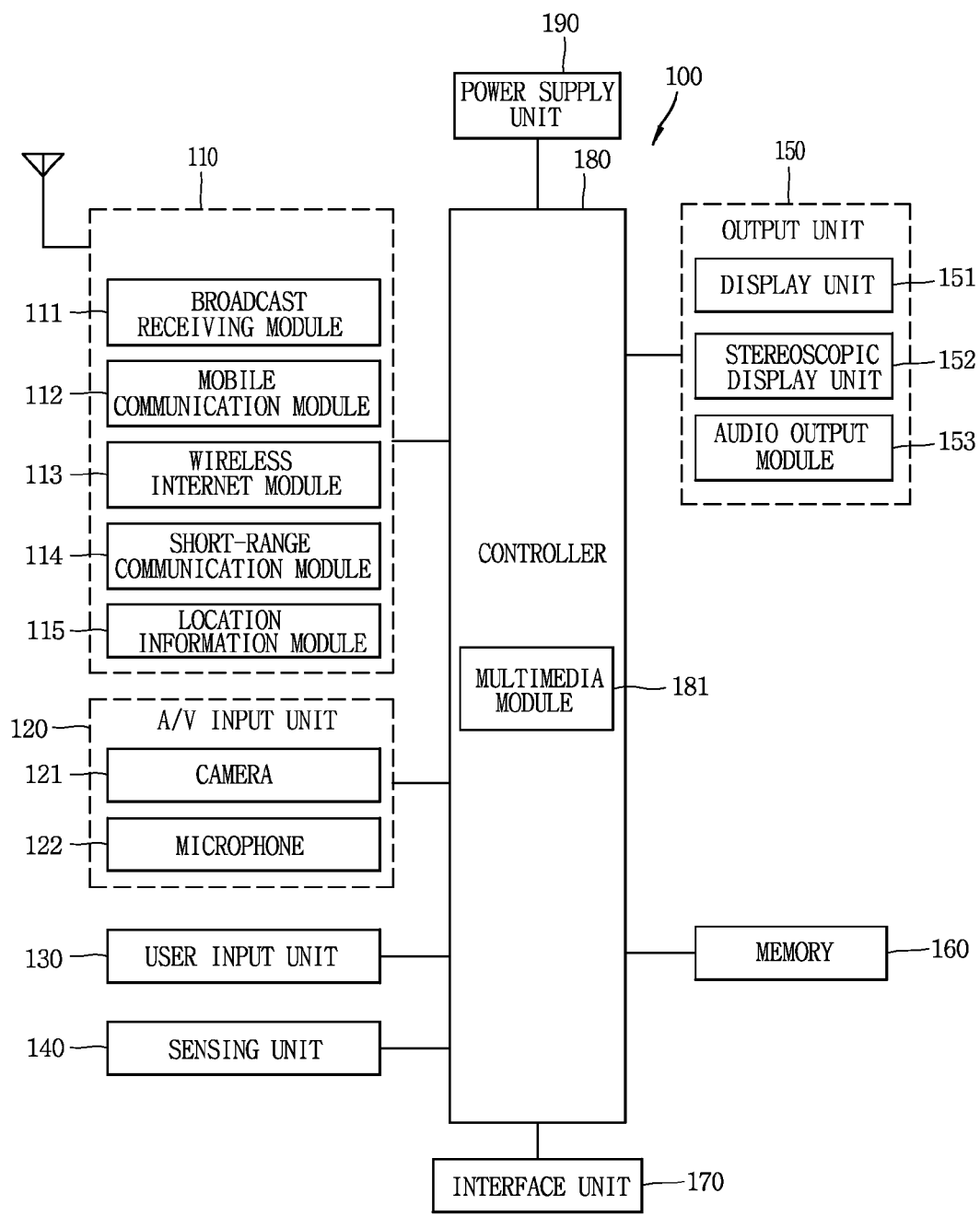
FIG. 1 is a block diagram of a mobile terminal according to an embodiment of the present invention.

FIG. 1 is a block diagram of a mobile terminal 100 in accordance with one exemplary embodiment.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (three-dimensional) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (three-dimensional) stereoscopic image, and the three-dimensional stereoscopic image is an image refers to an image making a viewer feel that a gradual depth and reality of an object on a monitor or a screen is the same as a reality space. A three-dimensional stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a three-dimensional stereoscopic image is comprised of a left image (a left eye image) and a right image (a right eye image). According to how left and right images are combined into a three-dimensional stereoscopic image, the three-dimensional stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a three-dimensional thumbnail image, a left image thumbnail and a right image thumbnail are generated from a left image and a right image of the original image frame, respectively, and then combined to generate a single three-dimensional thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a three-dimensional stereoscopic image is displayed on the stereoscopic display unit 152 by a stereoscopic processing unit (not shown). The stereoscopic processing unit may receive the three-dimensional image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input to the touch sensor.

Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a three-dimensional sensor sensing a touch operation are combined, the stereoscopic display unit 152 may also be used as a three-dimensional input device.

As examples of the three-dimensional sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the three-dimensional image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera, a photo sensor, and a laser sensor.

For example, the camera and the laser sensor may be combined to detect a touch of the sensing object with respect to a three-dimensional stereoscopic image. When distance information detected by a laser sensor is added to a 2D image captured by the camera, three-dimensional information can be obtained.

In another example, a photo sensor may be laminated on the mobile terminal. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 may convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the mobile terminal may include call signal reception, message reception, key signal inputs, a touch input etc. In addition to video or audio signals, the alarm unit 154 may output signals in a different manner, for example, using vibration to inform about an occurrence of an event. The video or audio signals may be also outputted via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be outputted or sequentially outputted.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a communication system which is operable with the mobile terminal 100 according to the present disclosure will be described.

Figure 2A:
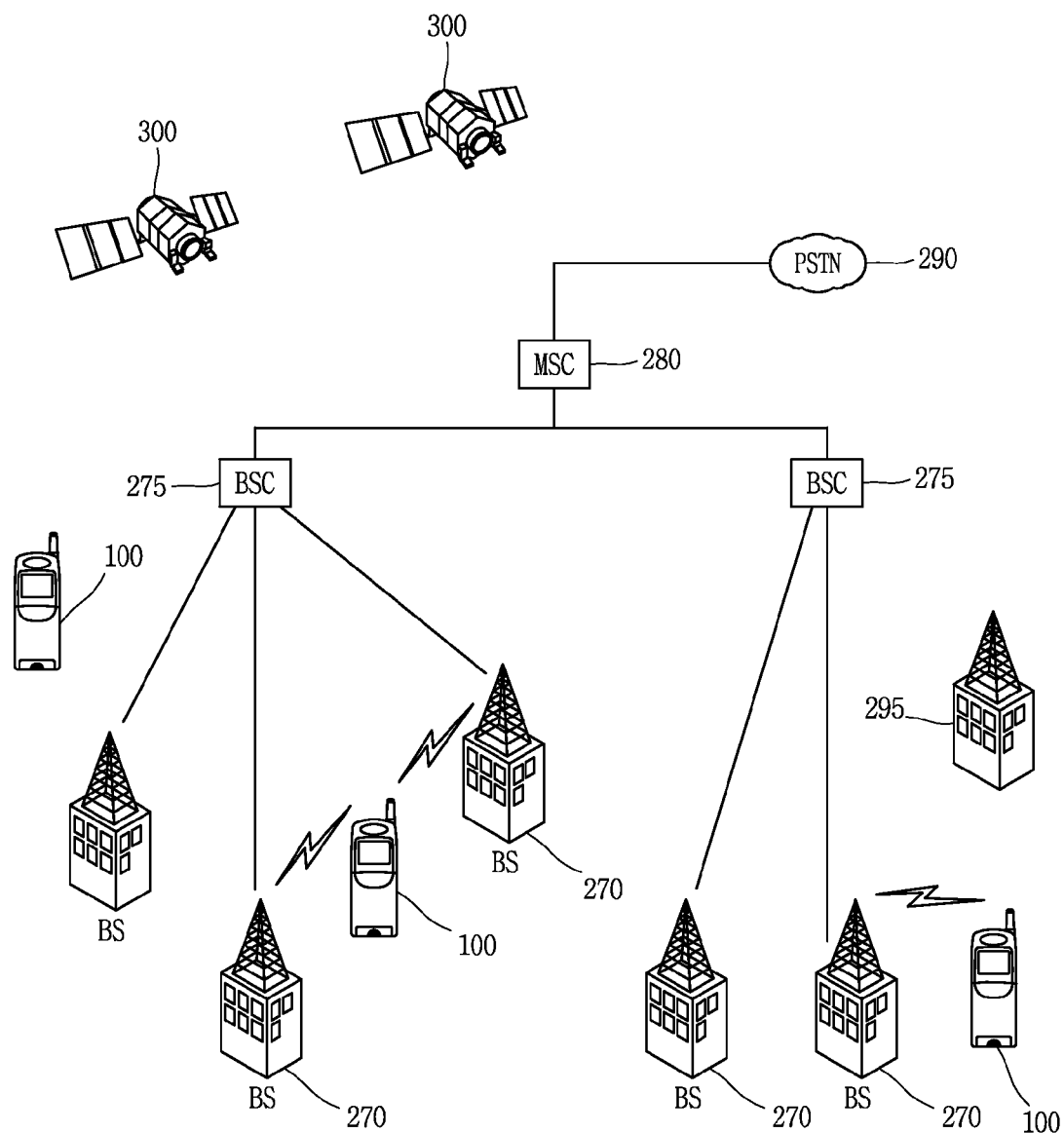
FIG. 2A is a block diagram of a wireless communication system where a mobile terminal according to an embodiment of the present invention can be operated.
Figure 2B:
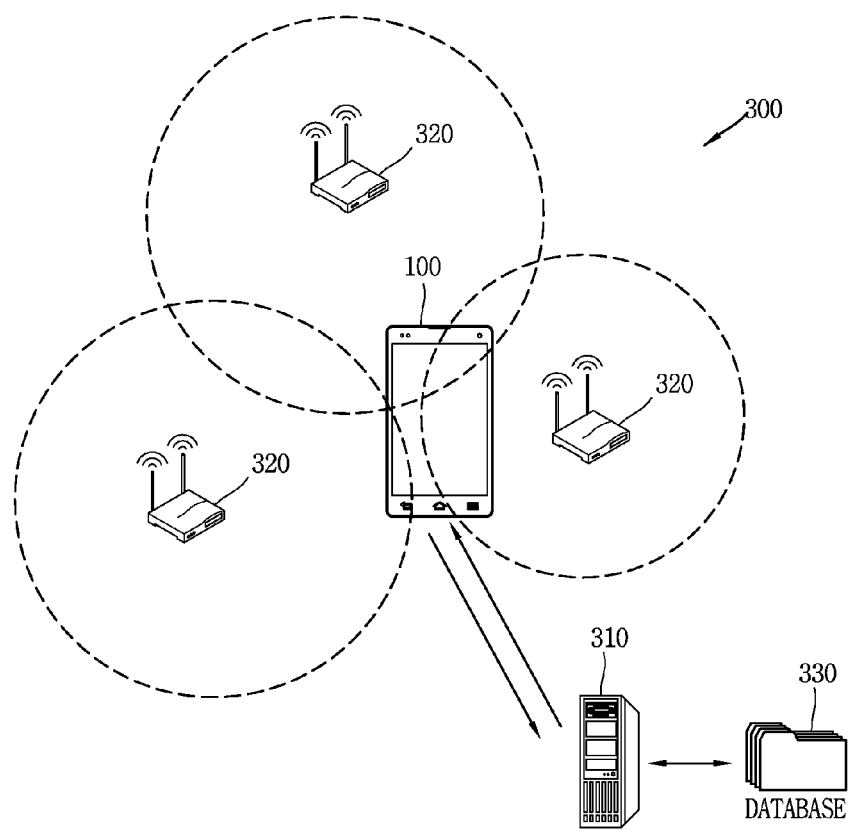
FIG. 2B is a block diagram of a WiFi positioning system where a mobile terminal according to an embodiment of the present invention can be operated.

FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of mobile terminal s 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the mobile terminal s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural mobile terminal s 100. Two satellites are depicted in FIG. 2, but it is understood that useful position information may be obtained with greater or fewer satellites than two satellites. The GPS module 115 (FIG. 1B) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminal s 100. The mobile terminal s 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminal s 100.

Hereinafter, description will be given of a method for acquiring location information of a mobile terminal using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the display device 100 may be transmitted to the display device 100 through the WiFi location determination server 310, thereby acquiring the location information of the display device 100.

The present invention provides a glass type terminal capable of manipulating various user interfaces (UI) displayed thereon in a more rapid and convenient manner, through a three-dimensional touch input using one finger or two fingers, not through the conventional two-dimensional touch input, and an input method thereof.

In the present invention, to provide three-dimensional touch input, a temple hinged to a lens and serving as an input device is implemented as a three-dimensional manner. The three-dimensional temple implies that the temple includes an upper surface, a lower surface and side surfaces. The temple is formed to have a quadrangular shape, a circular shape, a semi-circular shape, a diamond shape or a triangular shape.

The present invention is to enhance a user's convenience in manipulation by displaying information displayed on a screen in a hierarchical manner (e.g., upper, middle and lower of the screen), in correspondence to a configuration of a three-dimensional input device.

A device for implementing the present invention is not limited to a touch input device. That is, various sensors may be used in a glass type terminal in a three dimensional manner. Such sensors may include a proximity sensor, an IR gesture sensor, a pressure sensor and buttons.

Hereinafter, will be explained a method for configuring a three-dimensional touch input device, a method for defining a touch and/or a gesture using one finger or two fingers, and a method for controlling a screen using the defined touch and/or gesture.

Figure 3A:
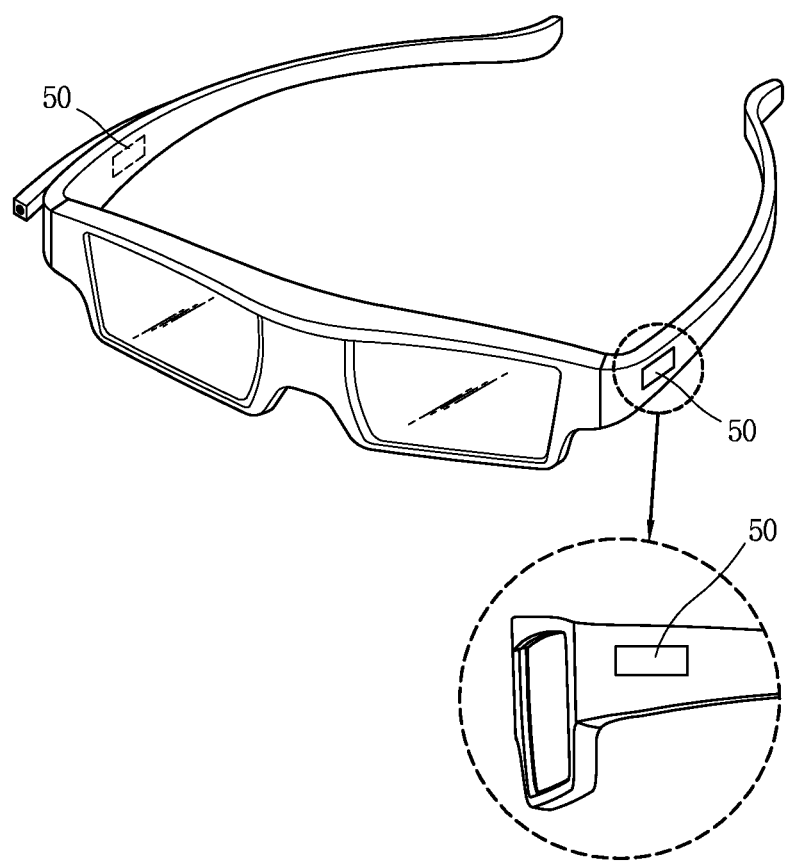
FIGS. 3A and 3B are views illustrating a configuration and an electrode pattern of a touch input device in accordance with the conventional art.
Figure 3B:
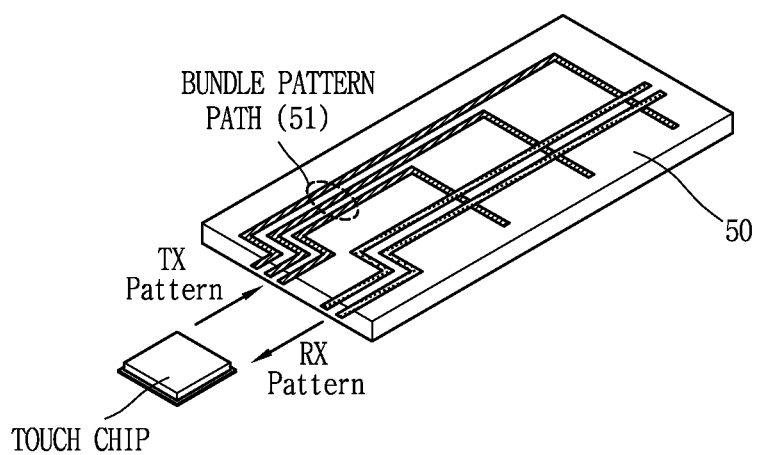

FIG. 3A illustrates a configuration of a touch input device in accordance with the conventional art. FIG. 3B illustrates a TX pattern and an RX pattern which constitute an electrode of a touch sensor.

Referring to FIG. 3, the conventional touch input device is provided with a touch pad (touch sensor) 50 of a narrow and long shape, at one side surface (outer side surface) of a temple. Under such configuration, a user controls a screen through a single tap or a double tap on the touch pad 50, using one finger or two fingers. Especially, in case of a DoP type touch pad 50, an X-axis touch sensing electrode (pattern) and a Y-axis touch sensing electrode (pattern) are connected to a touch chip inside the mobile terminal. TX electrodes are assembled to each other at one side of the temple to form a bundle.

In the conventional art, an additional space, where a bundle pattern path 51 for the TX electrodes is formed, should be obtained. This may cause a size of a bezel portion to be increased. Further, in case of the touch sensors 50 having the same size, a usable touch region is reduced due to the space for the bundle pattern path 51.

1. Configuration of Three-Dimensional Touch Input Device and Electrode Arrangement FIG. 4 is a view illustrating a structure of a three-dimensional input device according to the present invention.

Figure 4:
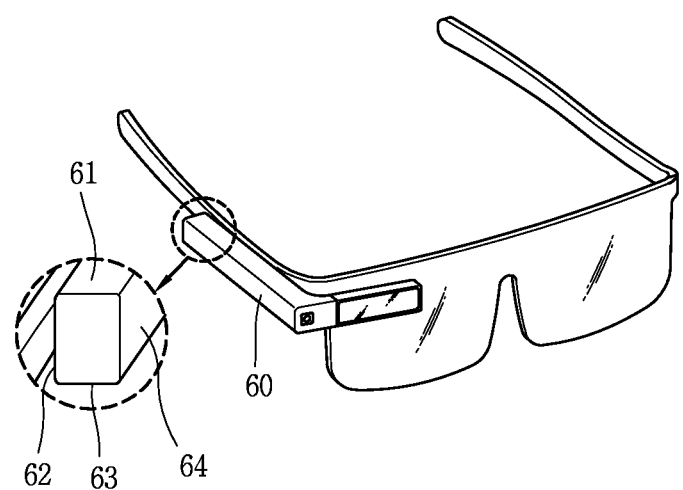
FIG. 4 is a view illustrating a structure of a three-dimensional input device according to the present invention.

As shown in FIG. 4, in the three-dimensional input device (touch input device) according to the present invention, a temple 60 is formed to have a plurality of surfaces (61-64). Then a touch sensor is provided on each of the polygonal surfaces (61-64). Touch patterns, configured to control a screen, are formed on an upper surface, a lower surface and an outer side surface. And a touch pattern, configured to determine whether a user has worn a glass type terminal or not, is formed on an inner side surface 64.

The surfaces of the temple may include a quadrangular shape and a diamond shape. However, the present invention is not limited to this. That is, the temple 60 may be formed in a semicircular shape, so that a cut-out surface thereof can form an inner side surface. In this case, touch patterns for controlling a screen may be formed on an upper surface, a lower surface and an outer side surface of the semicircle.

Figure 5:
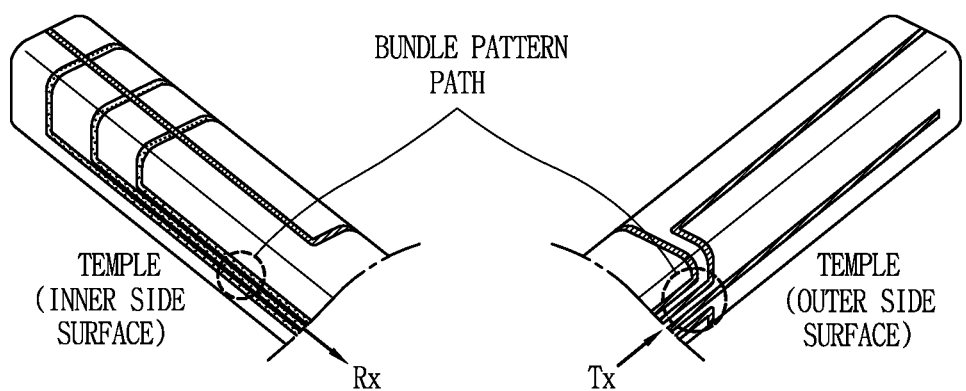
FIG. 5 is a view illustrating a touch pattern forming method of a three-dimensional input device according to the present invention.

FIG. 5 is a view illustrating a touch pattern forming method of a three-dimensional input device according to the present invention.

As shown in FIG. 5, TX electrodes (lines) are arranged in a lengthwise direction of the temple, and RX electrodes (lines) are arranged in a widthwise direction of the temple. In this case, the TX electrodes are arranged on upper, lower, right and left surfaces 61-64 of the temple, the three-dimensional input device. When a user has worn a glass type terminal, a bundle pattern is disposed on an inner side surface of the temple. That is, a bundle of RX electrodes are arranged on an inner side surface of the temple, whereas a bundle of TX electrodes are arranged at an inner corner region on an outer side surface of the temple. The reason is because a user has a difficulty in touching the inner side surface of the temple. The TX electrodes are arranged so as to be separated from other signals, for prevention of signal interference. Since the inner side surface cannot be easily touched by a user, a relatively smaller number of TX electrodes are arranged on the inner side surface 64. By using such TX electrodes, whether a user has worn the glass type terminal or not may be determined.

Hereinafter, various touch gestures using the three-dimensional input device will be explained.

2. Definition of Touch Gesture

Figure 6A:
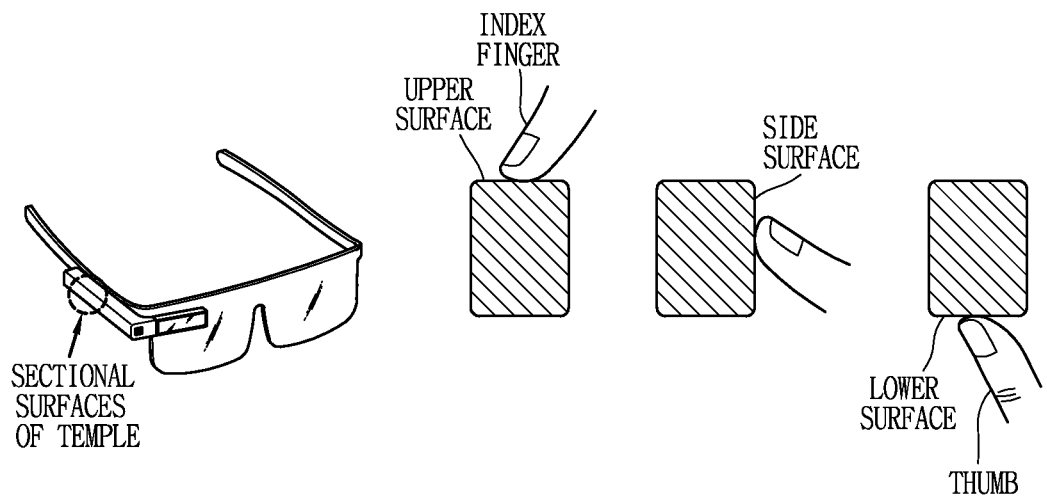
FIGS. 6A and 6B are examples to apply a touch gesture onto a glass type terminal using one finger, which illustrate a single touch and a double touch.
Figure 6B:
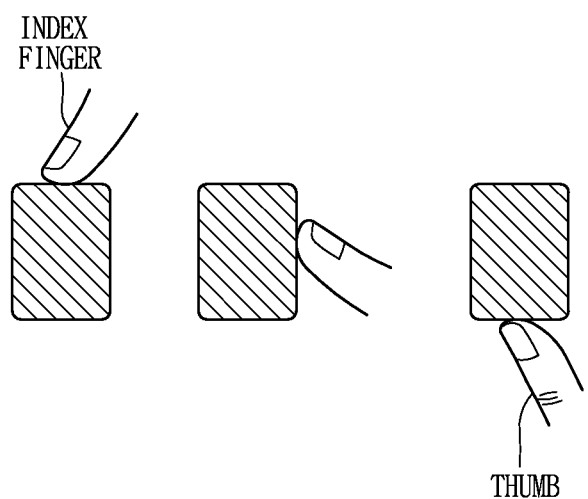

FIGS. 6A and 6B are examples to apply a touch gesture onto the glass type terminal using one finger, which illustrate a single touch and a double touch.

As shown in FIG. 6A, a user may rapidly touch an upper surface or an outer side surface of the temple using an index finger, and may rapidly touch a lower surface of the temple using a thumb. In the same manner, as shown in FIG. 6B, the user may rapidly double-touch the upper surface and the outer side surface of the temple using the index finger, and may rapidly double-touch the lower surface of the temple using the thumb.

Figure 7:
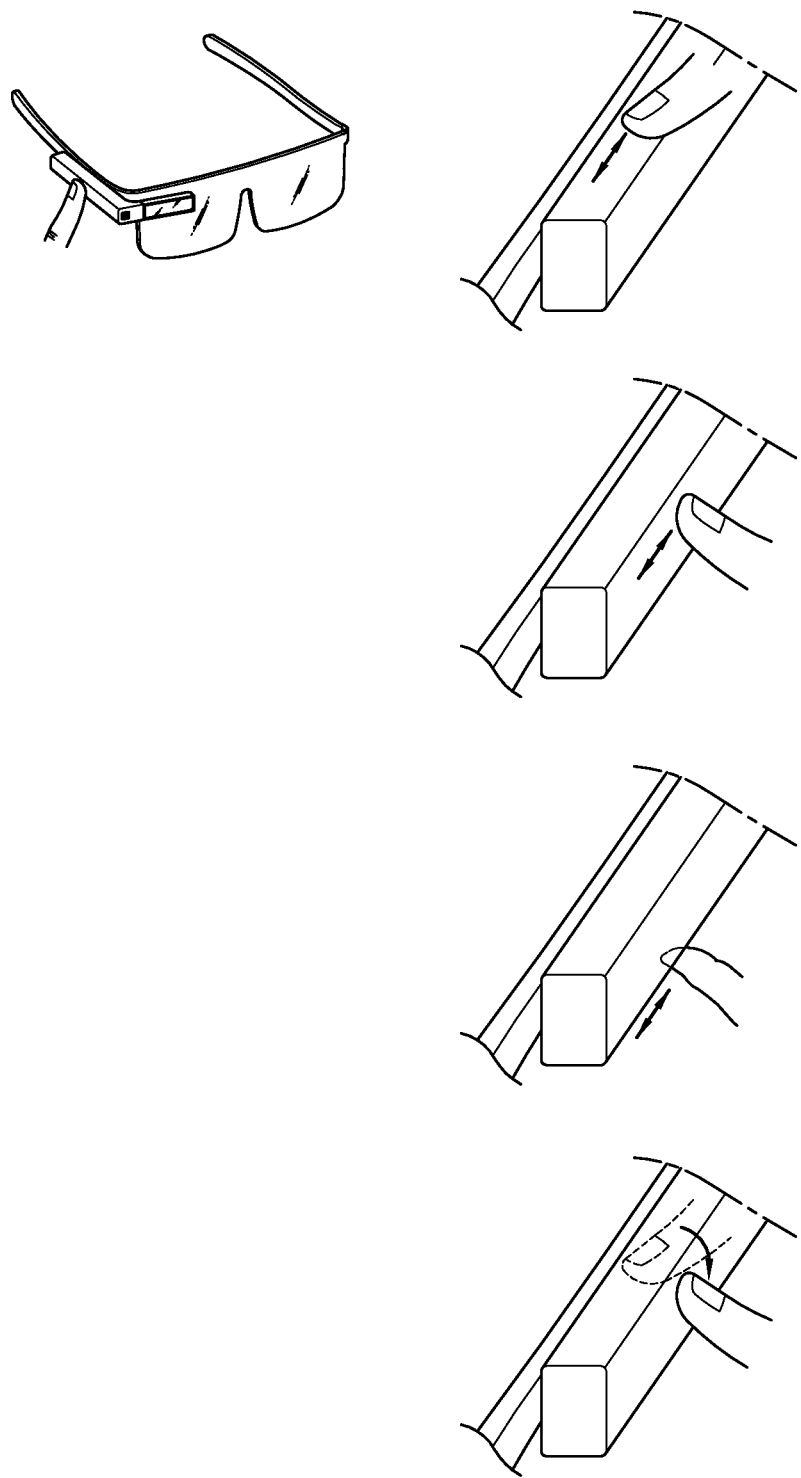
FIG. 7 is an example to apply a touch gesture onto a glass type terminal using one finger, which illustrate a drag operation and a flick operation.

FIG. 7 is an example to apply a touch gesture onto the glass type terminal using one finger, which illustrate a drag operation and a flick operation.

As shown in FIG. 7, the user performs a drag operation by long-touching the upper surface or the outer side surface of the temple back and forth, using the index finger which is on the upper surface or the outer side surface of the temple. Or, the user performs a drag operation by long-touching the lower surface of the temple back and forth, using the thumb which is on the lower surface of the temple. Alternatively, the user may perform a drag operation by long-touching the upper surface of the temple toward the outer surface, while the index finger is on the upper surface of the temple.

The user performs a flick operation by rapidly touching the upper surface or the outer side surface of the temple back and forth, using the index finger which is on the upper surface or the outer side surface of the temple. Or, the user performs a drag operation by rapidly touching the lower surface of the temple back and forth, using the thumb which is on the lower surface of the temple. Alternatively, the user may perform a flick operation by rapidly touching the upper surface of the temple toward the outer surface, in a state where the index finger is on the upper surface of the temple.

Figure 8A:
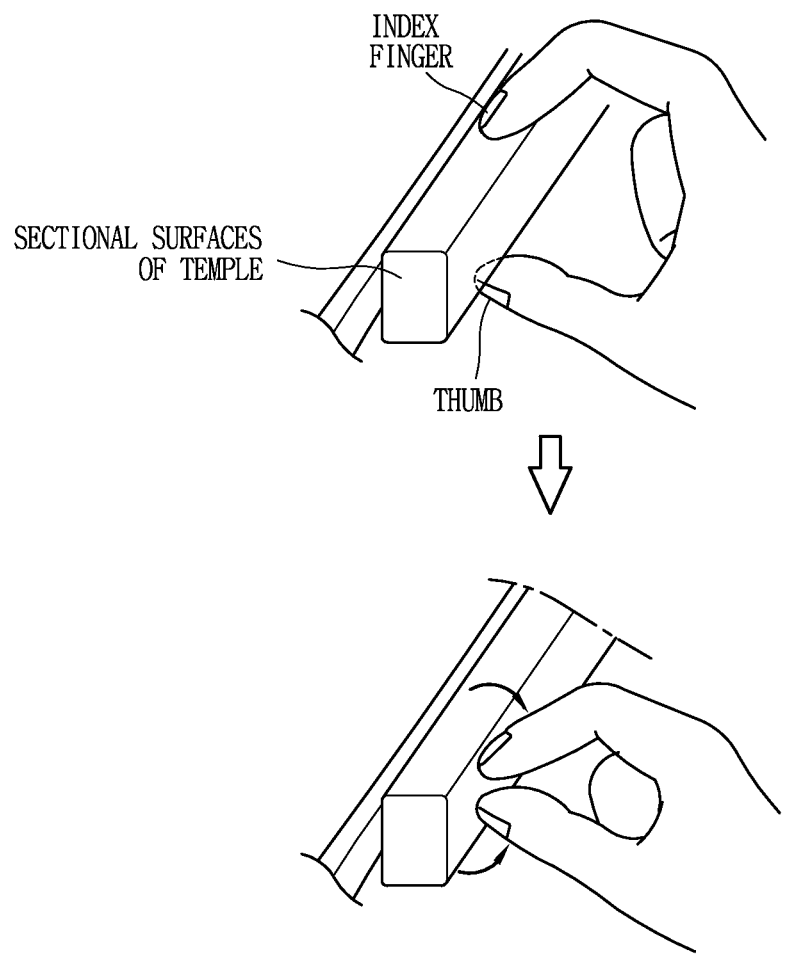
FIGS. 8A and 8B are examples to apply a touch gesture onto a glass type terminal using two fingers, which illustrate a pinch operation.
Figure 8B:
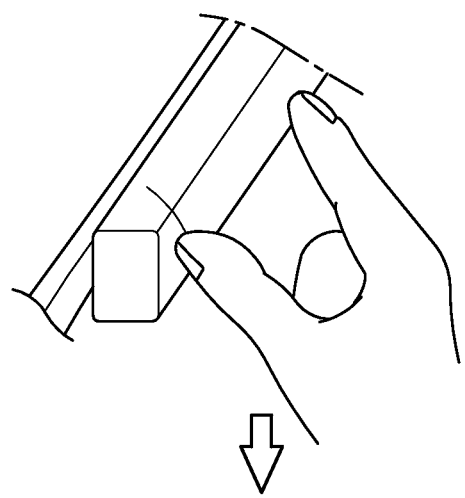
Figure 8B:
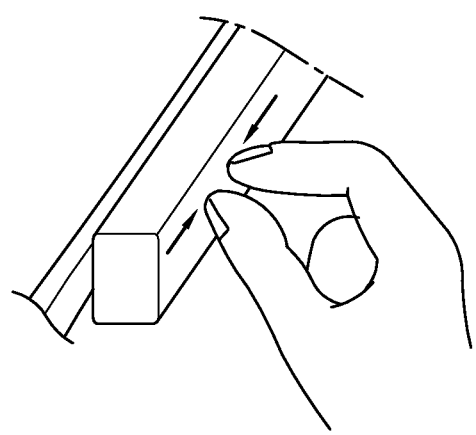

FIGS. 8A and 8B are examples to apply a touch gesture onto the glass type terminal using two fingers, which illustrate a pinch operation.

As shown in FIG. 8A, in a state where the index finger is on the upper surface of the temple and the thumb is on the lower surface of the temple in the glass type terminal, the two fingers are put together on the outer side surface for a pinch zoom-out operation. Alternatively, in a state where the index finger and the thumb are on the same surface (i.e., the outer side surface), the user may inward move the two fingers for a pinch zoom operation.

Figure 9A:
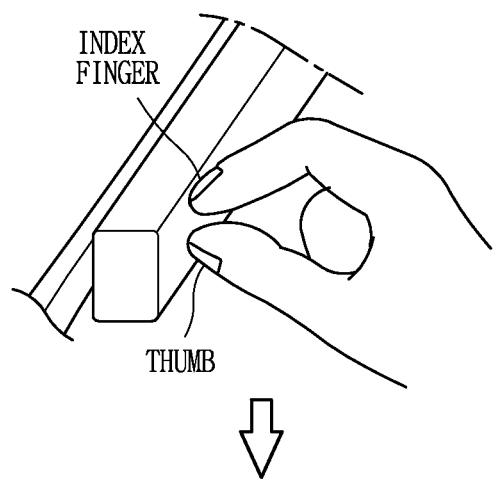
FIGS. 9A and 9B are examples to apply a touch gesture onto a glass type terminal using two fingers, which illustrate another pinch operation.
Figure 9A:
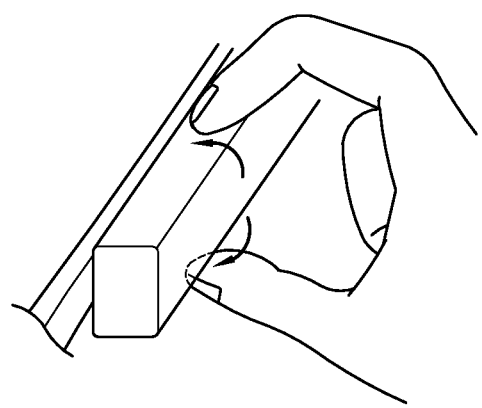
Figure 9B:
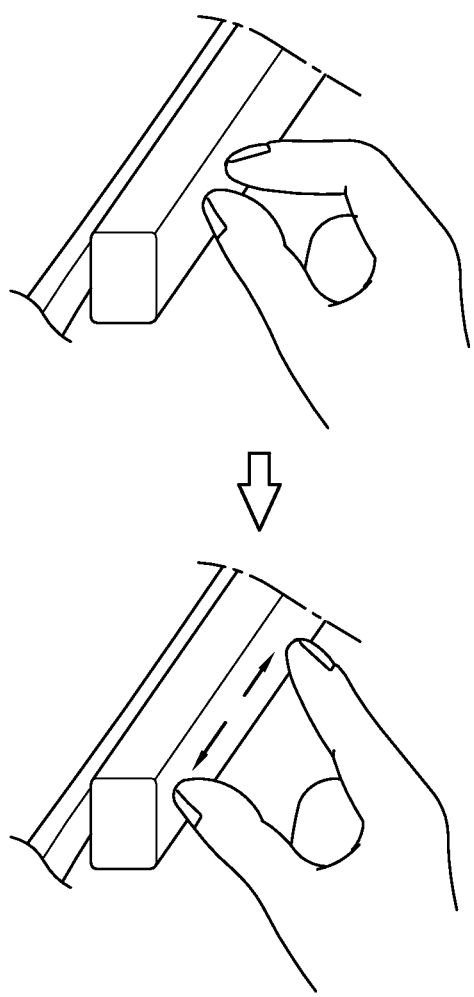

FIGS. 9A and 9B are examples to apply a touch gesture onto the glass type terminal using two fingers, which illustrate another pinch operation.

As shown in FIG. 9A, in a state where the index finger and the thumb are positioned on the same surface (i.e., the outer side surface), the index finger is moved to the upper surface and the thumb is moved to the lower surface, for a pinch zoom-in operation. As shown in FIG. 9B, in a state where the index finger and the thumb are positioned on the same surface (i.e., the outer side surface), the index finger and the thumb are outward moved for a pinch zoom operation.

Figure 10A:
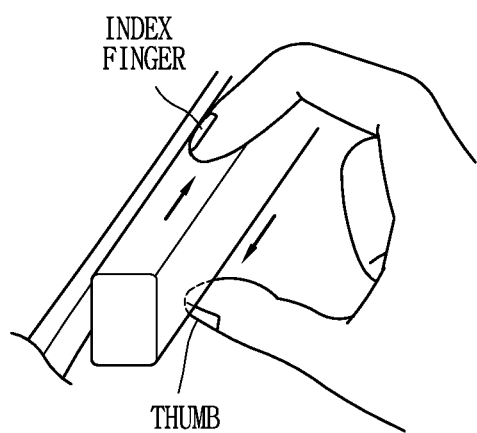
FIGS. 10A to 10C are examples to apply a touch gesture onto a glass type terminal using two fingers, which illustrate a rotation operation.
Figure 10B:
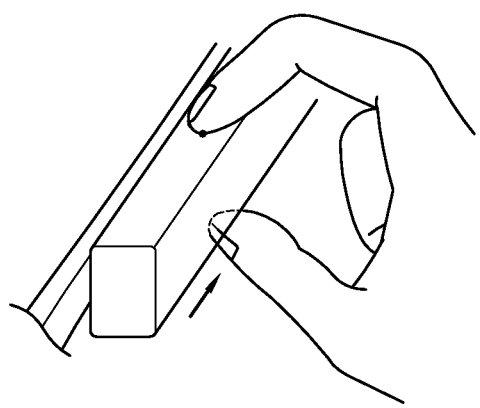
Figure 10C:
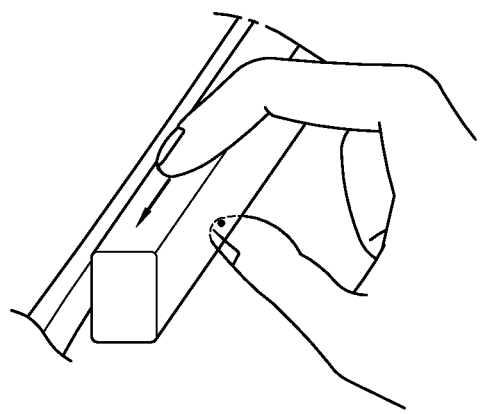

FIGS. 10A to 10C are examples to apply a touch gesture onto the glass type terminal using two fingers, which illustrate a rotation operation.

As shown in FIG. 10A, in a state where the index finger is on the upper surface and the thumb is on the lower surface, the user moves the two fingers in opposite directions. As shown in FIGS. 10B and 10C, the user may perform a rotation operation in different directions. More specifically, as shown in FIG. 10B, the thumb may be moved on the lower surface while the index finger is fixed to the upper surface. As shown in FIG. 10C, the index finger may be moved on the upper surface while the thumb is fixed to the lower surface.

3. Method for Controlling Screen by Touch Gesture

A screen of the glass type terminal is not proper to display menus on X and Y axes, because a user has a difficulty in monitoring menus arranged on the X and Y axes, due to external images overlapped with the menus.

Figure 11A:
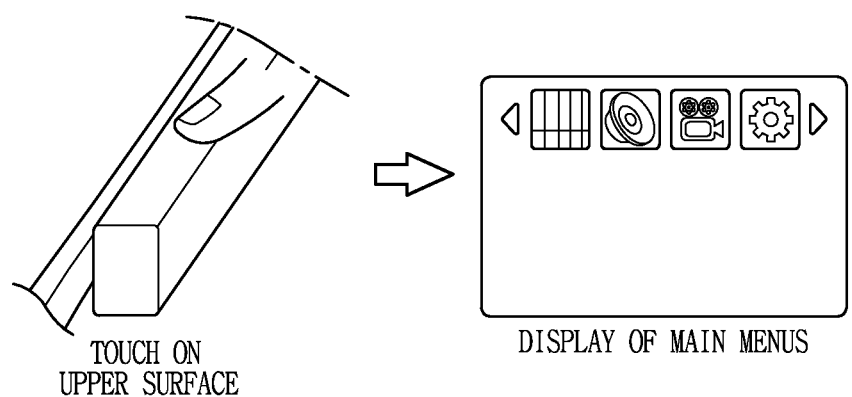
FIGS. 11A to 11C illustrate a method for controlling a screen by a touch gesture according to an embodiment of the present invention, which illustrate a menu displaying method.
Figure 11B:
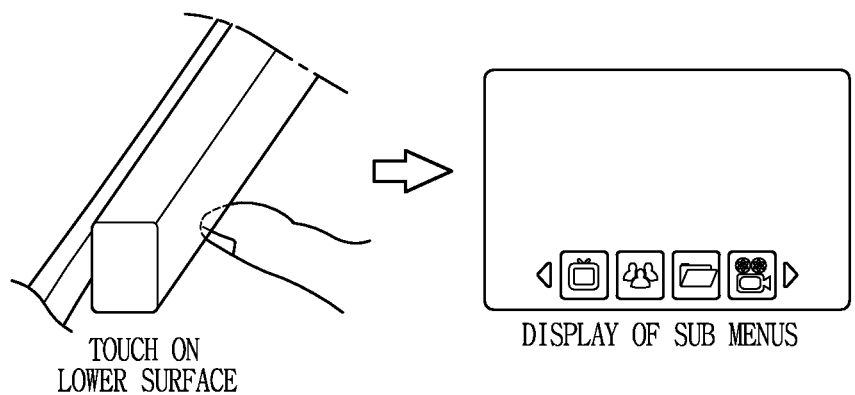
Figure 11C:
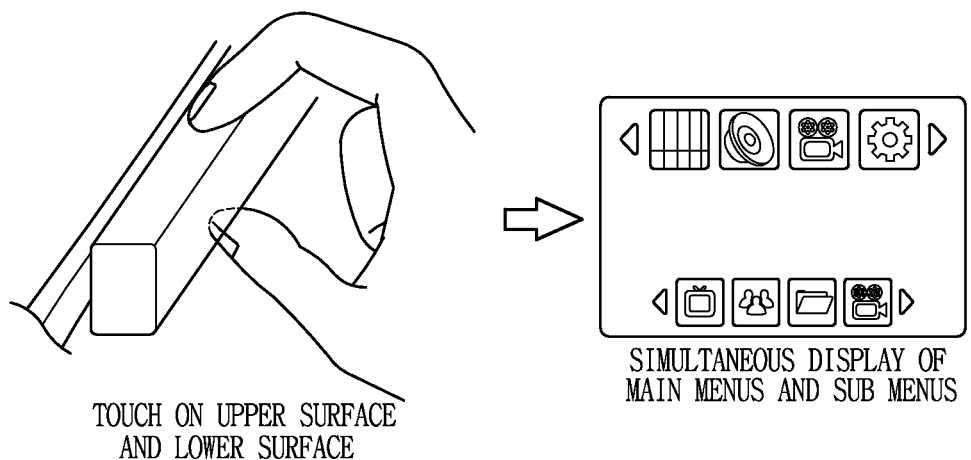

FIGS. 11A to 11C illustrate a method for controlling a screen by a touch gesture according to an embodiment of the present invention, which illustrate a menu displaying method.

The present invention is characterized in that menus are arranged on a single axis (e.g., X-axis) in a case where a touch sensor is configured at a temple of the glass type terminal in a three-dimensional manner. Especially, menus are displayed in correspondence to a touch on each surface of the temple. More specifically, as shown in FIG. 11A, if the index finger touches the upper surface of the temple, main menus are displayed on an upper region of the screen. On the contrary, as shown in FIG. 11B, if the thumb touches the lower surface of the temple, sub menus are displayed on a lower region of the screen.

As shown in FIG. 11C, if the index finger touches the upper surface of the temple and the thumb touches the lower surface of the temple, the main menus are displayed at the upper region of the screen while the sub menus are displayed at the lower region of the screen. In this case, a cursor is displayed on a preset menu.

Figure 12:
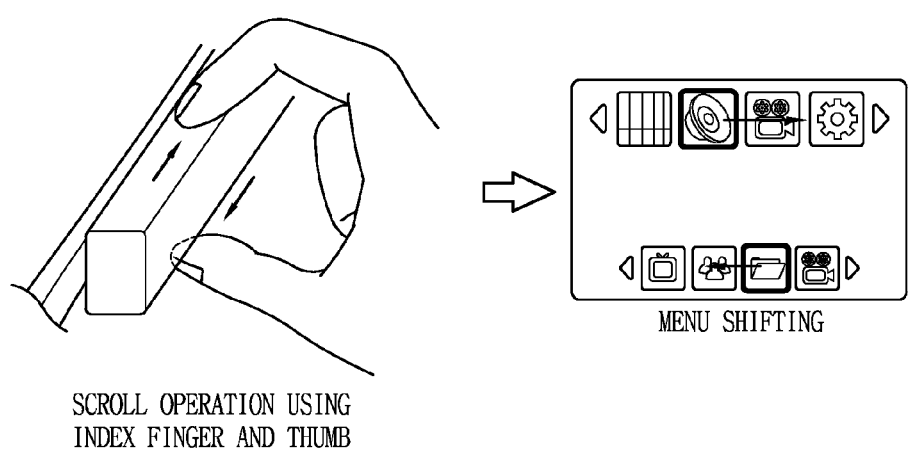
FIG. 12 illustrates a method for controlling a screen by a touch gesture according to an embodiment of the present invention, which illustrate a menu shifting method.

FIG. 12 illustrates a method for controlling a screen by a touch gesture according to an embodiment of the present invention, which illustrate a menu shifting method.

As shown in FIG. 12, the index finger touches the upper surface of the temple and the thumb touches the lower surface of the temple, so that the main menus and the sub menus are displayed on the upper region and the lower region of the screen, respectively. In this state, if the index finger or the thumb is dragged on the upper surface or the lower surface of the temple, the cursor is moved (scrolled) on the main menus or the sub menus along a direction of the drag input. Once the user touches (taps) the upper surface or the lower surface using the index finger or the thumb, one of the main menus and the sub menus, on which the cursor is currently located, is executed. Especially, if the index finger which is on the upper surface is dragged to the outer side surface, a specific menu is displayed in an enlarged manner.

Figure 13:
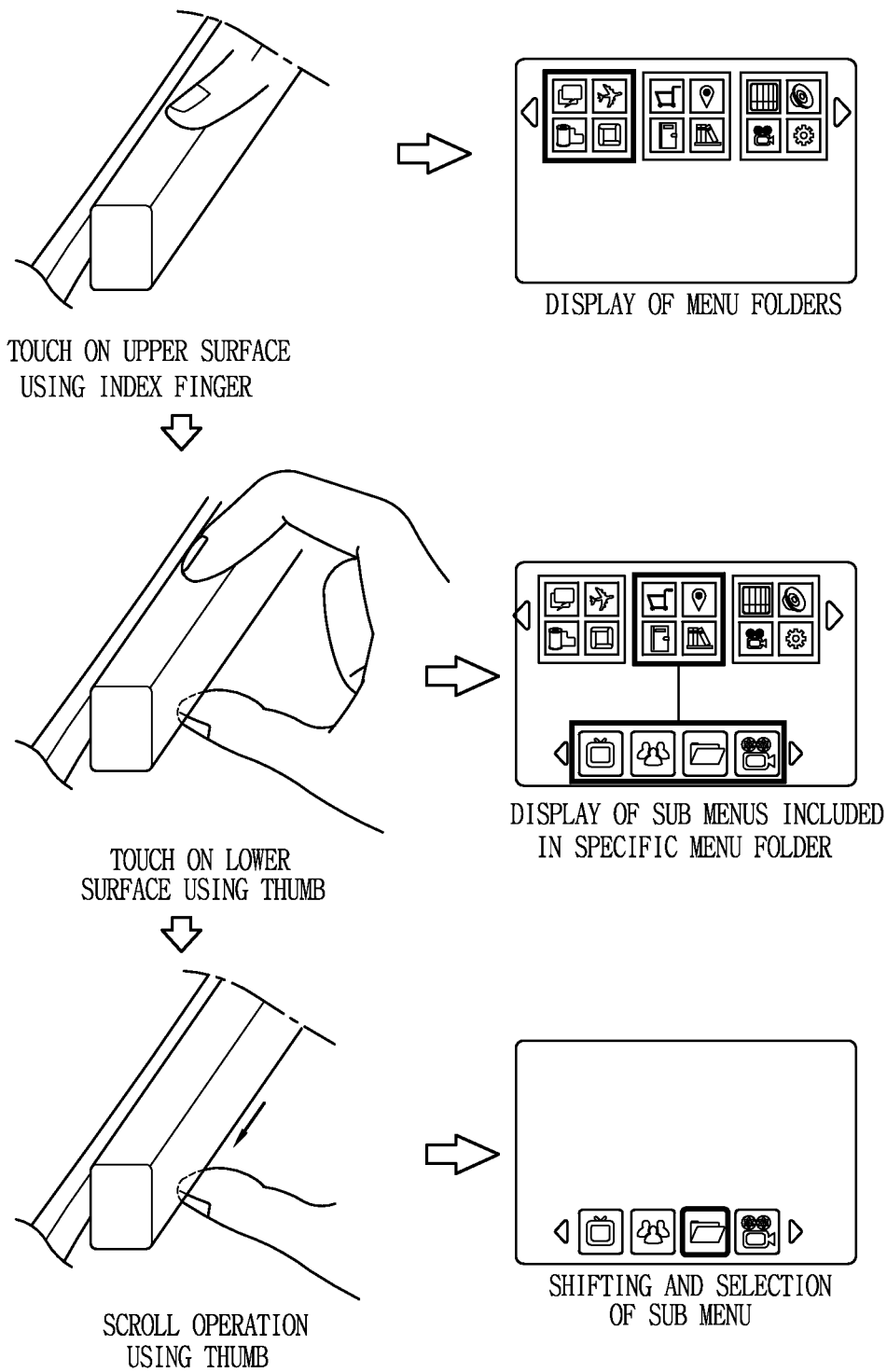
FIG. 13 illustrates a method for controlling a screen by a touch gesture according to an embodiment of the present invention, which illustrate a menu folder searching method.

FIG. 13 illustrates a method for controlling a screen by a touch gesture according to an embodiment of the present invention, which illustrate a menu folder searching method.

The method of FIG. 13 is the same as that of FIG. 12, except that a menu folder rather than menus is displayed. That is, if the index finger touches the upper surface of the temple and the thumb touches the lower surface of the temple, menu folders are displayed on the upper region of the screen, while sub menus of a specific menu folder are displayed on the lower region of the screen.

Figure 14:
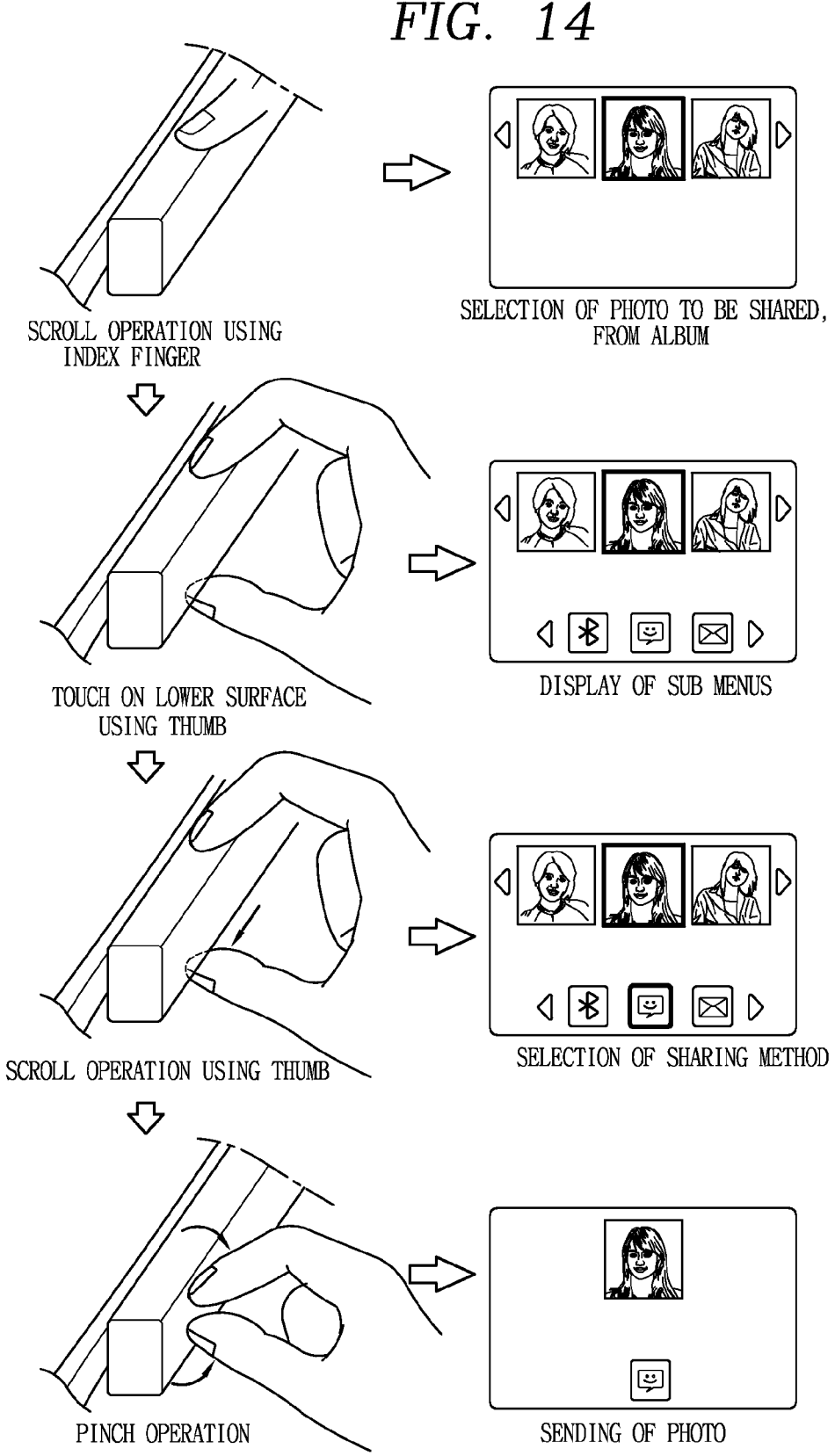
FIG. 14 illustrates a method for controlling a screen by a touch gesture according to an embodiment of the present invention, which illustrate an information sharing method.

FIG. 14 illustrates a method for controlling a screen by a touch gesture according to an embodiment of the present invention, which illustrate an information sharing method.

In the present invention, the user can easily share his or her information (file and album) with other user, by touching the temple using two fingers.

Firstly, the user may display main menus by touching the upper surface of the temple using the index finger. Then the user may select an album included in the main menus by performing a scroll operation and a touch operation using the index finger. Upon selection of the album, a plurality of photos are displayed on the upper region of the screen in a horizontal direction. The user selects a photo to be shared, by performing a scroll operation using the index finger.

Upon selection of the photo to be shared, the user touches the lower surface of the temple using the thumb, while the index finger is on the upper surface of the temple. As a result, sub menus of the selected photo are displayed on the lower region of the screen. The sub menus are menus related to the photo (main menu), which include an edition menu, a send menu and a storage menu.

The user performs a scroll operation on the lower surface of the temple using the thumb, thereby selecting a photo sharing menu among the sub menus displayed on the screen. Upon selection of the photo sharing menu, the user performs a pinch operation to move the index finger on the upper surface of the temple, and the thumb on the lower surface of the temple so as to be close to each other. As a result, the user can sends the selected photo to other user through the selected sharing menu.

Under such configuration, the user can easily share his or her desired information with other user, by touching the three-dimensional temple using two fingers.

Figure 15:
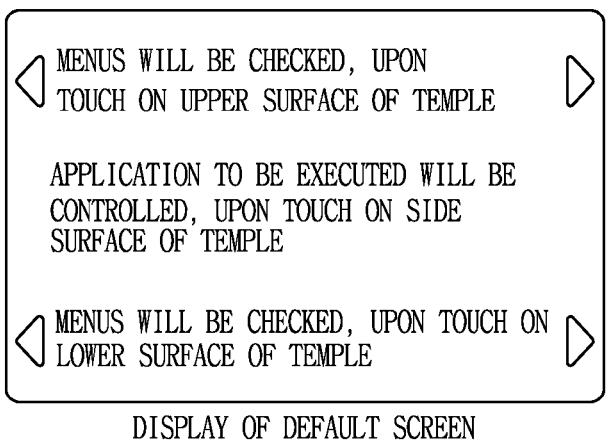
FIG. 15 is a view illustrating an example to display guide information in case of wearing a glass type terminal.
Figure 15:
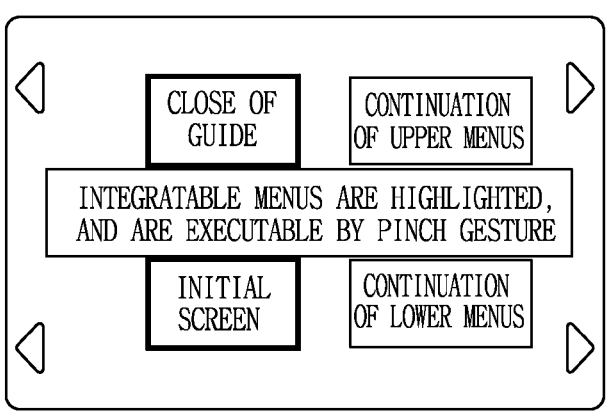
Figure 15:
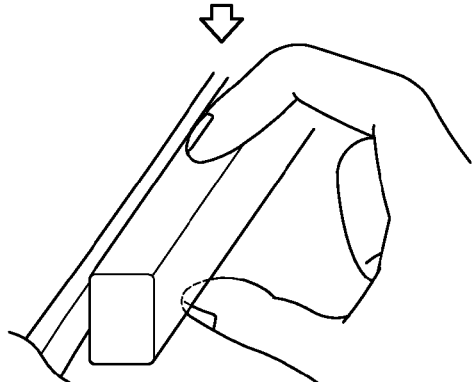

FIG. 15 is a view illustrating an example to display guide information in case of wearing the glass type terminal.

Once the user first wears the glass type terminal, the controller 180 senses the worn state, using a touch sensor positioned on the inner side surface of the temple. Then the controller 180 displays guide information on the upper region and the lower region of the screen, the guide information about menus to be displayed (i.e., the controller 180 displays a default screen). As shown in FIG. 15, the guide information may be implemented as a prescribed message or picture, an animation for user's intuitional understanding, etc.

If the user holds (touches) the upper surface and the lower surface of the temple in a state of the default screen, the controller 180 displays integratable menus in a highlighted manner, and displays a menu option. Under this state, if the user performs a pinch gesture using the index finger and the thumb or inputs an 'OK' voice, according to a guide message displayed on the screen, the controller 180 ends the guide and displays an initial screen. The user may selectively search a menu on an upper region of the default screen, or a menu on a lower region of the default screen, using the index finger or the thumb.

In the present invention, a finger gesture guide is displayed in a case where the user wears the glass type terminal. However, the preset invention is not limited to this. That is, the finger gesture guide may be displayed when an operation to lift up and move down the temple using two fingers (the index finger and the thumb) is performed, in a simple manner. The reason is because the controller 180 can recognize the user's intentional input by merely combining an acceleration and a touch of the glass type terminal with each other. The finger gesture guide may be set to be displayed only predetermined times, with respect to the same user.

Figure 16:
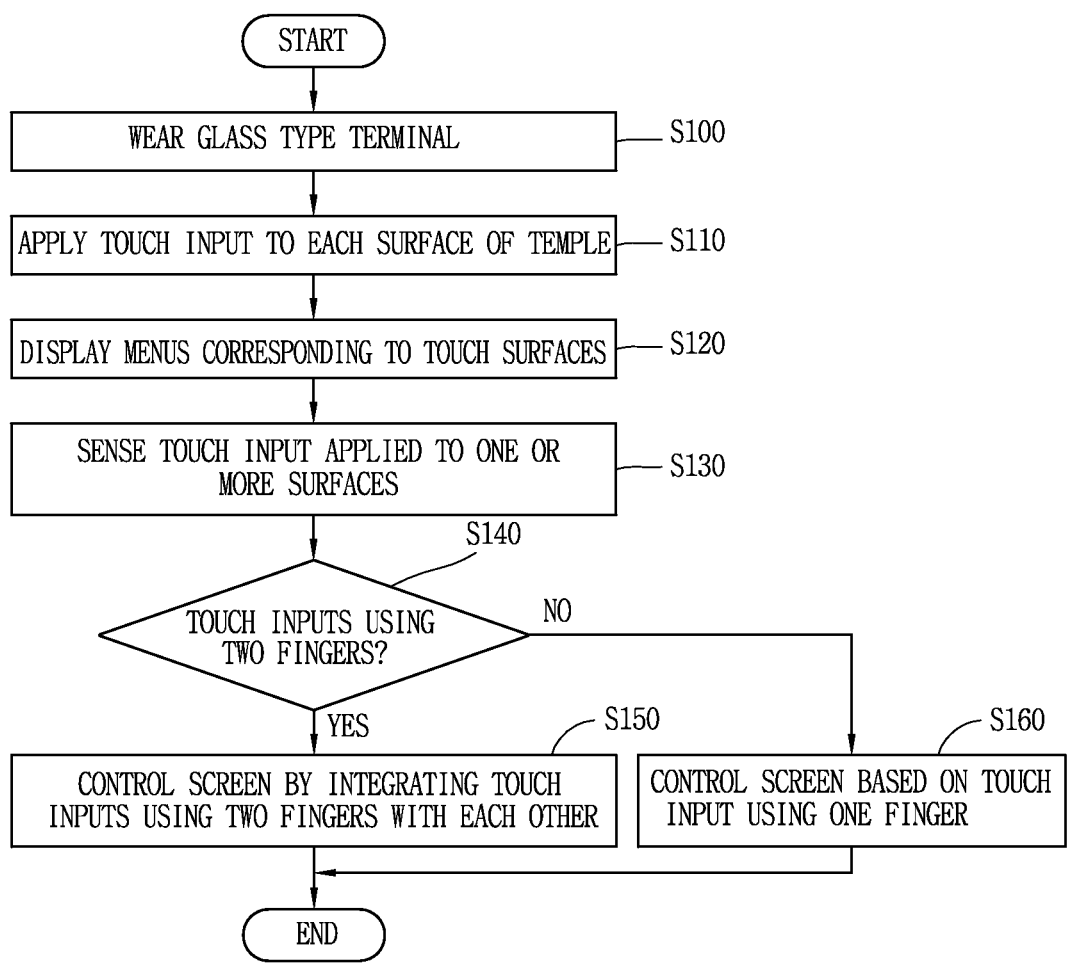
FIG. 16 is a flowchart illustrating a method for controlling a screen by a finger gesture according to the present invention.

FIG. 16 is a flowchart illustrating a method for controlling a screen by a finger gesture according to the present invention.

If the user first wears the glass type terminal, the controller 180 displays a default screen. However, if the user has worn the glass type terminal at least once, the controller 180 displays an initial screen rather than the default screen, on the display unit 151 (lens) (S100). The initial screen is a standby screen, which may display the user's reception information or time information. The lens is provided for a single eye or two eyes. The display unit 151 means a lens of eyeglasses.

If the user touches at least one surface of the temple serving as a three-dimensional input device, the controller 180 determines the touched surface (S110). Then the controller 180 displays a menu corresponding to the determine surface (S120). For instance, if the user touches the upper surface of the temple, main menus are displayed on the upper region of the screen. On the contrary, if the user touches the lower surface of the temple, sub menus are displayed on the lower region of the screen. The upper surface and the lower surface of the temple may be touched in a simultaneous manner, or in a sequential manner. If the user holds the upper surface and the lower surface of the temple, the glass type terminal automatically enters a capturing mode.

In a state where the menus have been displayed or the glass type terminal has entered a capturing mode, the controller 180 senses the user's one or more touch inputs on three surfaces of the temple (upper surface, lower surface and side surface), using a touch sensor (S130).

The controller 180 determines whether the user's one or more touch inputs on the three surfaces of the temple (upper surface, lower surface and side surface) have been performed using two fingers (S140). If it is determined that the touch inputs have been performed using two fingers, the controller 180 controls the screen by integrating the touch inputs using two fingers with each other (displaying, moving, simultaneous drag and flicking, pinch zoom, etc.) (S150). On the other hand, if it is determined that the touch inputs have been performed using one finger, the controller 180 controls the screen according to each touch input (simple selection and moving) (S160).

Figure 17:
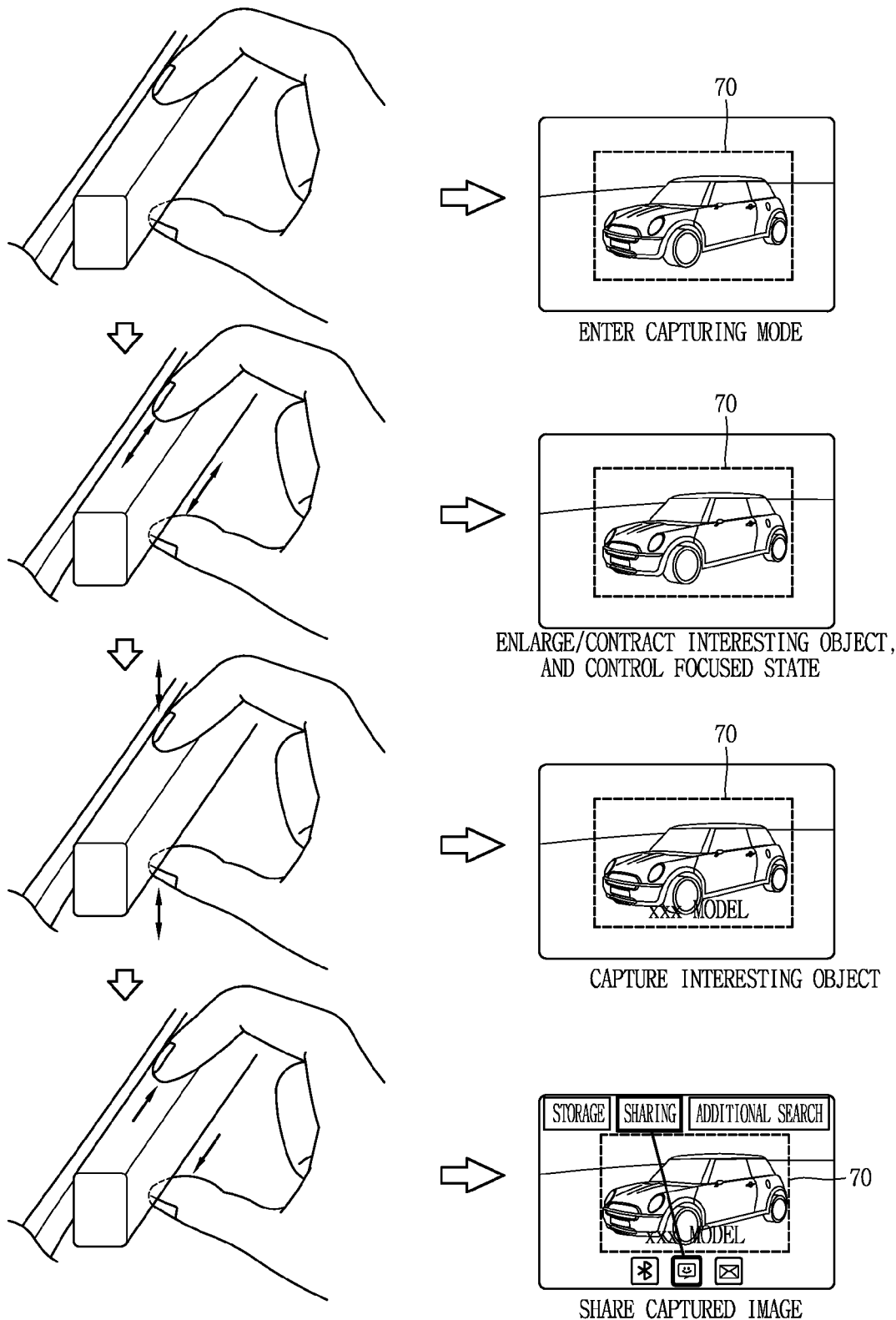
FIG. 17 is a view illustrating an example to capture a photo using a glass type terminal by a finger touch gesture.

FIG. 17 is a view illustrating an example to capture a photo using a glass type terminal by a finger touch gesture.

As shown in FIG. 17, in a case where the user has found an interesting object (e.g., Audi xxx model) while wearing the glass type terminal, if the user has held the upper surface and the lower surface of the temple using the index finger and the thumb, the controller 180 automatically enters a capturing mode (camera mode) to thus display a capturing region 70.

Under such state, if the user simultaneously moves two fingers forward or backward, the controller 180 displays the currently-displayed object in an enlarged or contracted manner. The user may control a focused state of the object, by moving his or her head right and left, little by little.

Once a capturing region and a focused state of the object are controlled, the user performs an operation to rapidly detach the two fingers from the upper surface and the lower surface of the temple, and then to hold the upper surface and the lower surface using the two fingers. By such operation, the controller 180 performs a capturing operation. An image of the captured object is displayed on the screen.

Then if the user performs a scroll operation on the temple using the index finger and the thumb, the controller 180 displays menus related to the captured photo, on the upper region and the lower region of the screen. Main menus are displayed on the upper region of the screen, and sub menus related to the main menus are displayed on the lower region of the screen. The user may store the captured photo in the memory 160 by performing a scroll operation using the index finger. In order to share the captured photo with other user, the user may perform a scroll operation using the index finger and the thumb to select a sharing menu and a talk menu, and then input a pinch gesture to put the two fingers together on the outer side surface of the temple.

In the present invention, a photo capturing operation using the glass type terminal was explained. However, the screen can be variously controlled by touching a plurality of surfaces of the temple using one finger or two fingers.

The present invention can have the following advantages.

A touch region (touch sensor region) is provided on each of the surfaces of the temple of the glass type terminal. The touch region on each surface is configured to allow a touch input using two fingers, as well as a touch input using one finger. Under such configuration, various types of applications and screens displayed on the lens can be easily controlled according to a touch input to each surface of the temple.

According to one embodiment disclosed in the present specification, the method described above may be realized by being stored as processor-readable codes in a program-stored medium. A ROM, a RAM, a CD-ROM, a magnetic tape, a floppy disk, an optical data storage device and the like are examples of the processor-readable medium, and the processor-readable medium may be realized in the form of a carrier wave (for example, a transmission over the Internet). The processor may include the controller of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal configured to be worn on a head of a user as eyewear, comprising:
 a lens coupled to a frame;
 an arm coupled to a frame and having a plurality of sides comprising an upper side, a lower side opposite from the upper side, an inner side disposed to face the head of the user, and an outer side opposite the inner side;
 a touch sensor located on or in at least two different sides of the plurality of sides of the arm; and
 a controller operatively connected to the touch sensor and configured to control the terminal to display a screen on the lens based on touches to the touch sensor,
 wherein the touch sensor comprises transmit-electrodes arranged in a lengthwise direction of the arm, and receive-electrodes arranged in a widthwise direction of the arm, and
 wherein a bundle of the receive-electrodes are arranged on the inner side of the arm and a bundle of the transmit-electrodes are arranged at an inner corner region on the outer side of the arm.

2. The terminal of claim 1,
 wherein the lens comprises
 a single lens configured to display the screen for one eye of the user wearing the terminal, or
 a pair of lenses configured to display the screen for two eyes of the user wearing the terminal.

3. The terminal of claim 1, wherein the touch sensor comprises one or more touch patterns.

4. The terminal of claim 1,
 wherein one of the at least two different sides is an inner side of the arm facing the head of the user, and
 wherein the controller is configured to determine whether the terminal is or is not currently being worn by the user based on an input detected by at least a portion of the touch sensor located on or in the inner side of the arm.

5. The terminal of claim 1,
 wherein the at least two different sides includes at least two of an upper side, a lower side, or an outer side of the arm relative to the user when the terminal is worn on the head of the user, and
 wherein the controller is configured to control the screen based on touches detected on the at least two of the upper side, the lower side, or the outer side of the arm.

6. The terminal of claim 1,
 wherein a relatively smaller number of transmit electrodes arranged in the lengthwise direction are located on an inner side of the arm than are located on another side of the plurality of sides.

7. The terminal of claim 1, further comprising:
 a camera operatively connected to the controller and configured to capture a still or moving picture; and
 a movement sensor operatively connected to the controller and configured to sense a movement of the user's head,
 wherein the controller is configured to:
 enter a still or moving picture capture mode upon sensing that the user touches each of the at least two different sides for a predetermined time;
 enlarge or contract a preview image of an object to be captured by the camera upon sensing that the user simultaneously moves the touches to each of the at least two different sides in opposite directions;
 focus the object to be captured according to a sensed moving direction of the user's head while touching each of the at least two different sides; and
 capture the object upon sensing that the user removes the touches from each of the at least two different sides.

8. The terminal of claim 1, wherein the controller is configured to
 display a main menu on an upper region of the screen upon sensing that a touch on a first side of the at least two different sides is moved along the first side,
 display a sub menu on the screen upon sensing that a touch on a second side of the at least two different sides is moved along the second side, and
 display both of the main menu and the sub menu on the screen upon sensing that touches to the first and second sides are simultaneously moved in opposite directions the along the first and second sides, respectively.

9. The terminal of claim 8, wherein the controller is configured to integrate a function of the main menu and a function of the sub menu upon sensing a movement of the touches to the first and second sides to a third side of the at least two different sides.

10. The terminal of claim 1, wherein the controller is configured to display a gesture guide on the screen upon sensing that the terminal is placed on the user's head initially or after a predetermined period of non-use, or upon sensing that the arm is lifted up and moved down via touches to the at least two different sides.

11. The terminal of claim 1, wherein the controller is configured to
 display a first menu on an upper region of the screen upon sensing a touch on a first side of the at least two different sides,
 display a second menu on a lower region of the screen upon sensing a touch on a second side of the at least two different sides, and
 one of
 scroll the first and second menus upon sensing that the touches to the first and second sides are simultaneously moved in opposite directions the along the first and second sides, respectively, or
 scroll a corresponding one of the first and second menus upon sensing that one of the touches to the first and second sides is moved while the other of the touches to the first and second sides is held stationary.

12. A method for operating a terminal configured to be worn on a head of a user as eyewear, the terminal including a lens coupled to a frame, an arm coupled to a frame and having a plurality of sides, a touch sensor located on or in at least two different sides of the plurality of sides, a camera configured to capture a still or moving picture, a movement sensor configured to sense a movement of the user's head; and a controller operatively connected to the touch sensor and the movement sensor, the method comprising:
 controlling the terminal to display a screen on the lens based on touches to the touch sensor,
 entering a capture mode when touches are detected to each of the at least two different sides for a predetermined length of time;
 enlarging or contracting a preview image of an object to be captured by the camera when the detected touches to the at least two different sides are moved in opposite directions;
 focusing the object to be captured according to a direction of movement of the user's head detected by the movement sensor while the touches to each of the at least two different sides are maintained; and capturing an image of the object when the touches to each of the at least two different sides are removed,
wherein the plurality of sides of the arm comprise an upper side, a lower side opposite from the upper side, an inner side arranged to face a head of the user, and an outer side opposite from the inner side.

13. The method of claim 12, wherein one of the at least two different sides is an inner side of the arm facing the head of the user, the method further comprising:
determining whether the terminal is or is not currently being worn by the user based on an input detected by at least a portion of the touch sensor.

14. The method of claim 12, wherein the at least two different sides includes at least two of an upper side, a lower side, or an outer side of the arm relative to the user when the terminal is worn on the head of the user, the method further comprising:
controlling the screen based on touches detected on the at least two of the upper side, the lower side, or the outer side of the arm.

15. The method of claim 12, further comprising:
displaying a main menu on an upper region of the screen upon sensing that a touch on a first side of the at least two different sides is moved along the first side;
displaying a sub menu on the screen upon sensing that a touch on a second side of the at least two different sides is moved along the second side; and
displaying both of the main menu and the sub menu on the screen upon sensing that touches to the first and second sides are simultaneously moved in opposite directions the along the first and second sides, respectively.

16. The method of claim 15, further comprising:
integrating a function of the main menu and a function of the sub menu upon sensing a movement of the touches to the first and second sides to a third side of the at least two different sides.

17. The method of claim 12, further comprising:
displaying a gesture guide on the screen upon sensing that the terminal is placed on the user's head initially or after a predetermined period of non-use, or upon sensing that the arm is lifted up and moved down via touches to the at least two different sides.

18. The method of claim 12, further comprising:
displaying a first menu on an upper region of the screen upon sensing a touch on a first side of the at least two different sides;
displaying a second menu on a lower region of the screen upon sensing a touch on a second side of the at least two different sides; and
scrolling the first and second menus upon sensing that the touches to the first and second sides are simultaneously moved in opposite directions the along the first and second sides, respectively, or
scrolling a corresponding one of the first and second menus upon sensing that one of the touches to the first and second sides is moved while the other of the touches to the first and second sides is held stationary.

* * * * *